United States Patent
Kaneko et al.

(10) Patent No.: US 9,600,031 B2
(45) Date of Patent: Mar. 21, 2017

(54) COMMODITY SALES DATA PROCESSING APPARATUS

(71) Applicant: TOSHIBA TEC KABUSHIKI KAISHA, Tokyo (JP)

(72) Inventors: Toshihiro Kaneko, Shizuoka (JP); Toru Nishiie, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/984,136

(22) Filed: Dec. 30, 2015

(65) Prior Publication Data

US 2016/0231779 A1 Aug. 11, 2016

(30) Foreign Application Priority Data

Feb. 10, 2015 (JP) ................................. 2015-024231

(51) Int. Cl.
- G06F 1/16 (2006.01)
- E05B 73/00 (2006.01)
- G07G 1/00 (2006.01)

(52) U.S. Cl.
CPC ........ G06F 1/1632 (2013.01); E05B 73/0082 (2013.01); G06F 1/1626 (2013.01); G06F 1/1637 (2013.01); G07G 1/0018 (2013.01)

(58) Field of Classification Search
CPC combination set(s) only.
See application file for complete search history.

(56) References Cited

U.S. PATENT DOCUMENTS

| | | | | |
|---|---|---|---|---|
| 5,555,491 A | * | 9/1996 | Tao | G06F 1/1632 248/185.1 |
| 5,619,397 A | * | 4/1997 | Honda | G06F 1/1632 361/679.43 |
| 5,784,253 A | * | 7/1998 | Ooka | G06F 1/1632 361/679.43 |
| 5,948,074 A | * | 9/1999 | Ninomiya | G06F 1/1632 361/679.41 |
| 6,101,087 A | * | 8/2000 | Sutton | B60R 11/0252 361/679.44 |
| 6,856,506 B2 | * | 2/2005 | Doherty | G06F 1/1632 16/329 |
| 7,079,384 B2 | * | 7/2006 | Wang | E05B 73/0082 248/918 |

(Continued)

FOREIGN PATENT DOCUMENTS

JP 2012137979 7/2012

*Primary Examiner* — Lisa Lea Edmonds
(74) *Attorney, Agent, or Firm* — Patterson & Sheridan, LLP

(57) ABSTRACT

In one embodiment, a commodity sales data processing apparatus has a data processing terminal and a docking station. Further, the commodity sales data processing apparatus has a connection mechanism and a lock mechanism. The connection mechanism connects the data processing terminal and the docking station in a separable state. The lock mechanism locks connection by the connection mechanism, so as to make the connection by the connection mechanism from in the separable state to in an inseparable state. Further, the lock mechanism releases locking of the connection by the connection mechanism when a specific key operation is performed.

10 Claims, 5 Drawing Sheets

(56) References Cited

U.S. PATENT DOCUMENTS

| | | | | |
|---|---|---|---|---|
| 8,427,826 | B2 * | 4/2013 | Sullivan | G06F 1/1616 |
| | | | | 248/346.06 |
| D707,685 | S * | 6/2014 | Johnson | D14/447 |
| 8,949,144 | B2 * | 2/2015 | Kim | G07G 1/0018 |
| | | | | 705/16 |
| 2010/0073862 | A1 * | 3/2010 | Carnevali | G06F 1/1632 |
| | | | | 361/679.43 |
| 2012/0066079 | A1 * | 3/2012 | Falzone | G06Q 20/20 |
| | | | | 705/16 |
| 2012/0134102 | A1 * | 5/2012 | Sullivan | G06F 1/1616 |
| | | | | 361/679.43 |
| 2012/0236435 | A1 * | 9/2012 | Kaneko | G06F 1/187 |
| | | | | 360/97.19 |
| 2013/0109253 | A1 * | 5/2013 | Gammon | F16M 11/10 |
| | | | | 439/883 |
| 2013/0262248 | A1 * | 10/2013 | Kim | G07G 1/0018 |
| | | | | 705/17 |
| 2015/0032557 | A1 * | 1/2015 | Suzuki | G06Q 20/206 |
| | | | | 705/18 |
| 2016/0132856 | A1 * | 5/2016 | Nishiie | G06F 13/4081 |
| | | | | 705/24 |
| 2016/0133103 | A1 * | 5/2016 | Kanomata | G06F 3/12 |
| | | | | 705/16 |
| 2016/0231778 | A1 * | 8/2016 | Kaneko | G06F 1/1632 |

* cited by examiner

COMMODITY SALES DATA PROCESSING APPARATUS

CROSS-REFERENCE TO RELATED APPLICATION

This application is based upon and claims the benefit of priority from the prior Japanese Patent Application No. 2015-024231, filed on Feb. 10, 2015, the entire contents of which are incorporated herein by reference.

FIELD

Embodiments described herein relate generally to a commodity sales data processing apparatus including a portable data processing terminal and a docking station.

BACKGROUND

Recently, a portable, so-called tablet type information terminal has become widespread. Also in a commodity sales data processing apparatus which is used in combination with a POS (Point of sale) system, one in which a portable data processing terminal and a stationary type docking station are combined begins to be introduced.

In a commodity sales data processing apparatus of this type, since a data processing terminal can be separated from a docking station, an operator, such as an employee of a store, can perform a settlement processing while waiting on a customer, at a place irrespective of a place of a cash register.

And, the data processing terminal is placed on a placing portion of the docking station, at the time of charging of a battery of the data processing terminal and data communication with the docking station, for example, and is connected to the docking station via a connector.

But, the connection between the data processing terminal and the docking station is in a state that they are separable at any time. For this reason, the data processing terminal is in a state that it can be taken out by any one at any time. In addition, when impact is applied to a table on which the docking station is placed, the data processing terminal might drop from the placing portion of the docking station, and further the above-described connector might be damaged by the impact due to drop.

DETAILED DESCRIPTION

Figure 1:
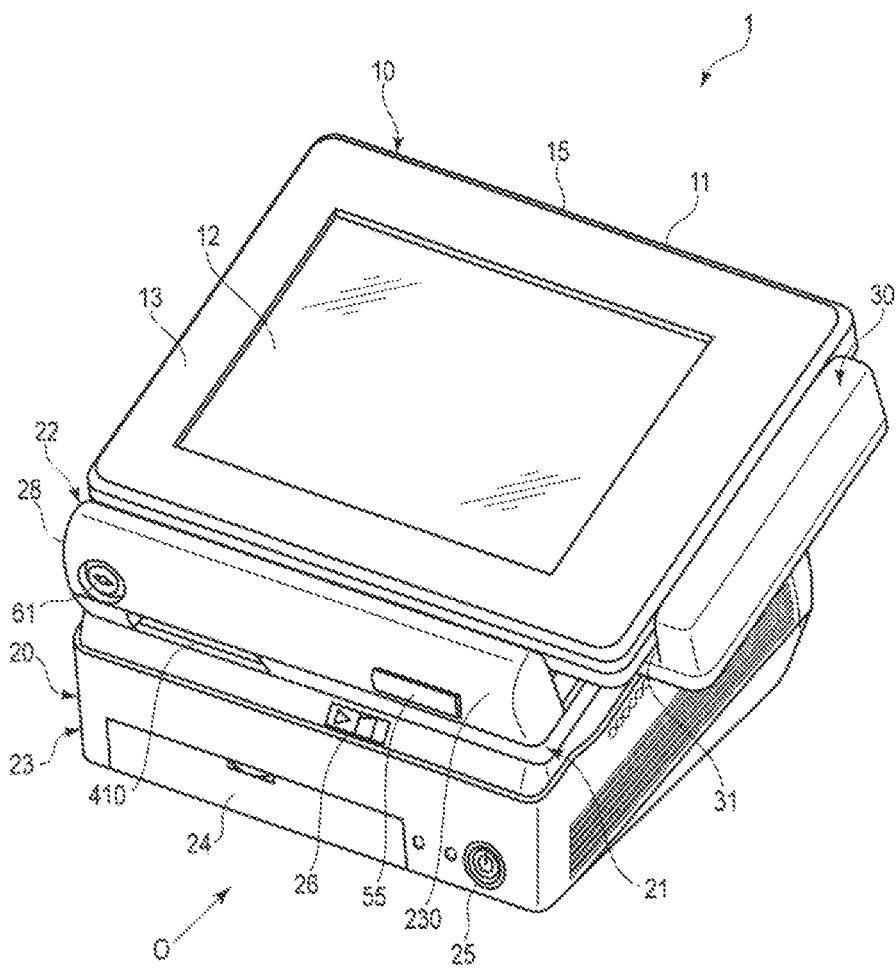
FIG. 1 is a perspective view showing a commodity sales data processing apparatus according to an embodiment.

According to one embodiment, a commodity sales data processing apparatus has a portable data processing terminal, a docking station, a connection mechanism, and a lock mechanism. The data processing terminal has a first connector and a touch panel. The docking station has a second connector which connects to the first connector and feeds power to the data processing terminal, when the data processing terminal is connected to the docking station. The connection mechanism connects the data processing terminal and the docking station in a separable state. The lock mechanism locks connection by the connection mechanism, so as to make the connection by the connection mechanism from in the separable state to in an inseparable state, and releases locking of the connection by the connection mechanism when a specific key operation is performed.

Hereinafter, further embodiments will be described with reference to the drawings. In the drawings, the same symbols indicate the same or similar portions.

FIG. 1 is an overall perspective view of a commodity sales data processing apparatus 1.

Figure 2:
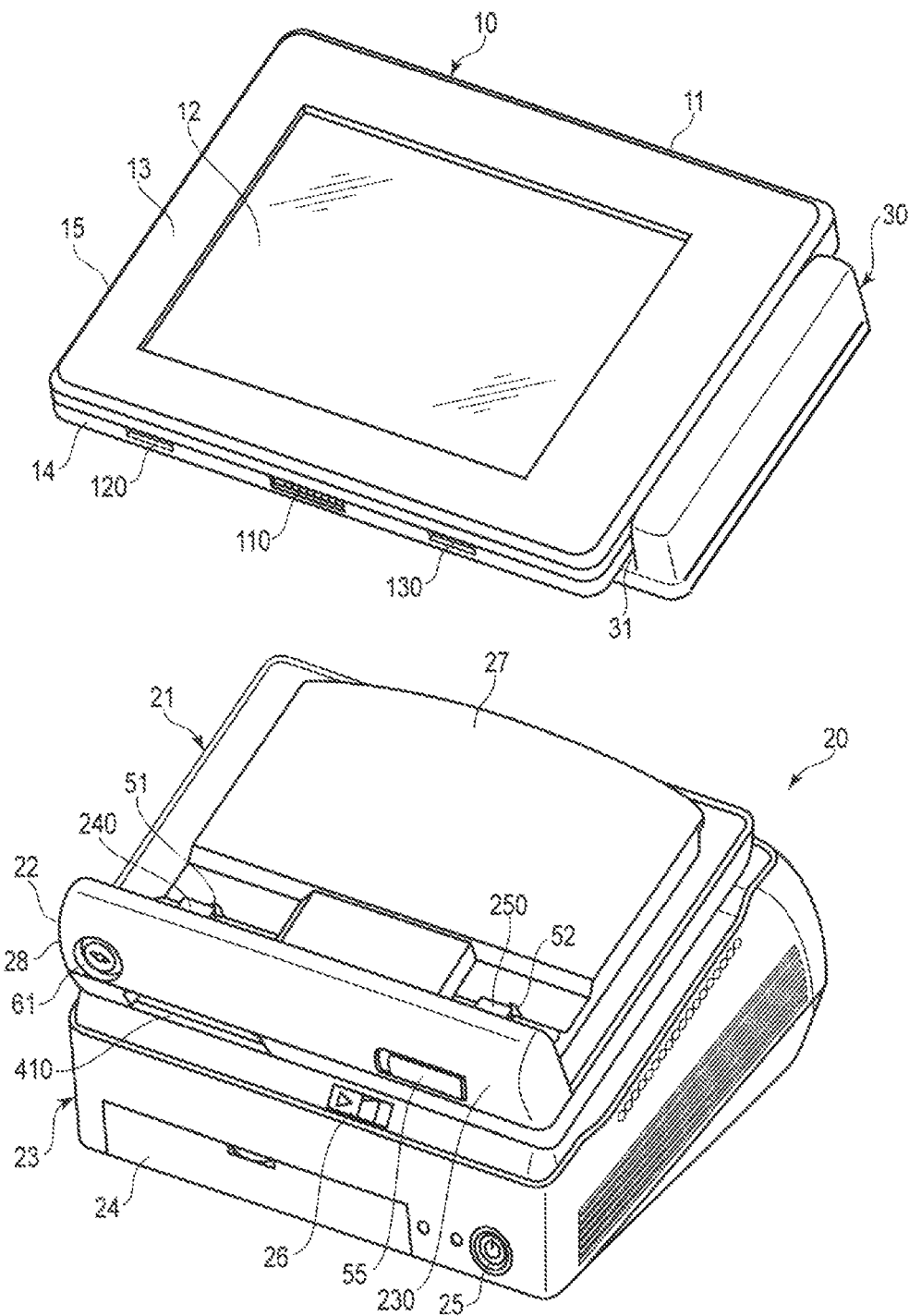
FIG. 2 is a perspective view showing a state that the docking station and the data processing terminal of the commodity sales data processing apparatus according to the embodiment are separated.

FIG. 2 is a perspective view showing the commodity sales data processing apparatus 1 in which a data processing terminal 10 is separated from a docking station 20.

Figure 3:
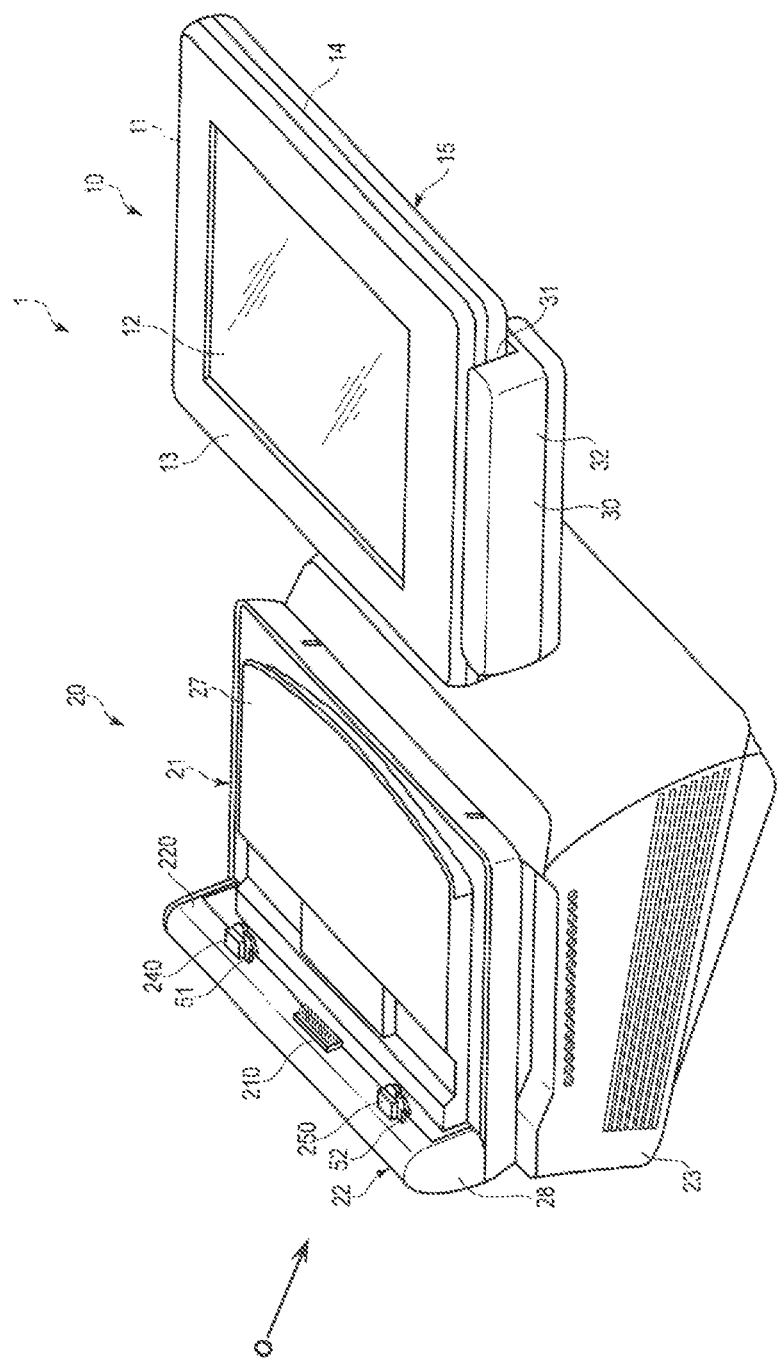
FIG. 3 is a perspective view, seen from another angle, showing a state that the docking station and the data processing terminal of the commodity sales data processing apparatus according to the embodiment are separated.

FIG. 3 is a perspective view of the commodity sales data processing apparatus 1 shown in FIG. 2 which is seen from another angle.

Figure 4:
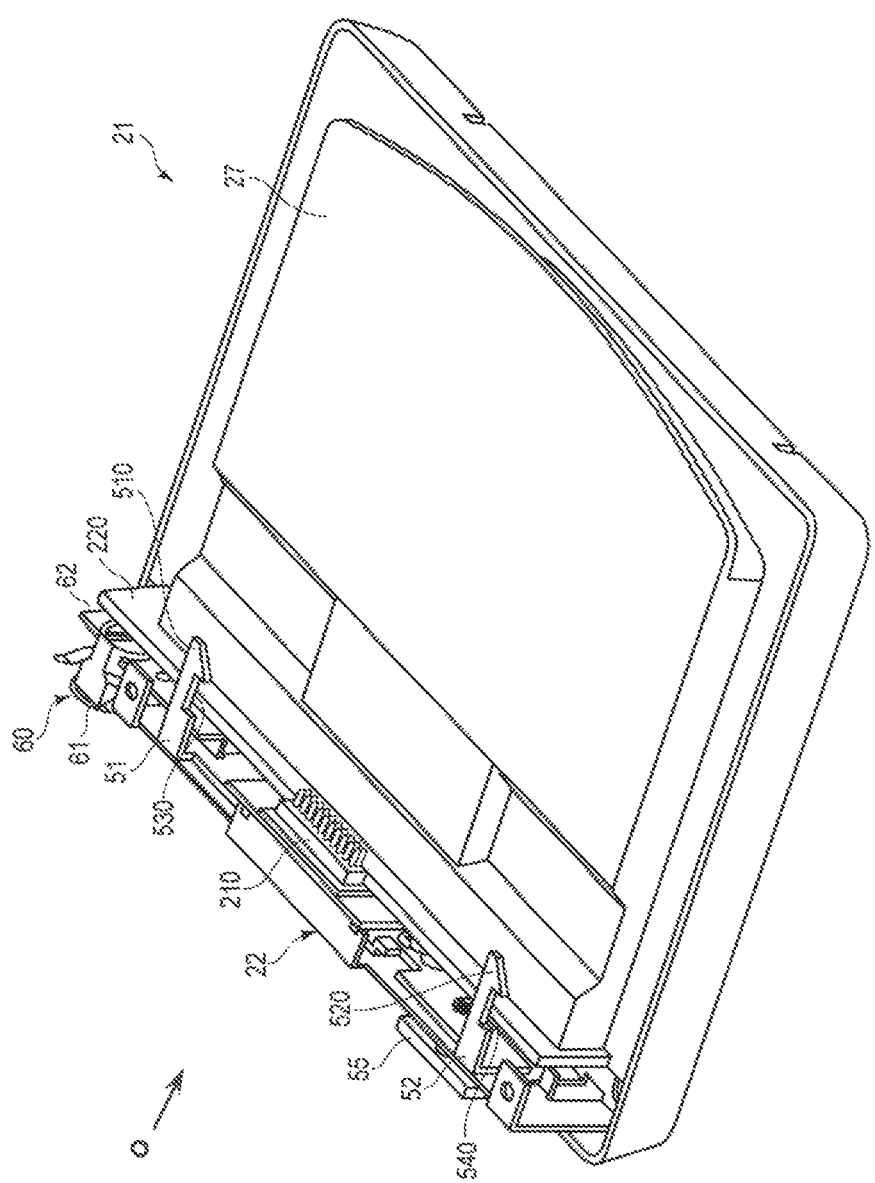
FIG. 4 is a perspective view showing a state that the cover of the connection portion of the docking station of the commodity sales data processing apparatus according to the embodiment is removed.

FIG. 4 is a perspective view showing a state that an upper cover of a connection portion 22 of a table 21 of the docking station 20 is removed.

Figure 5:
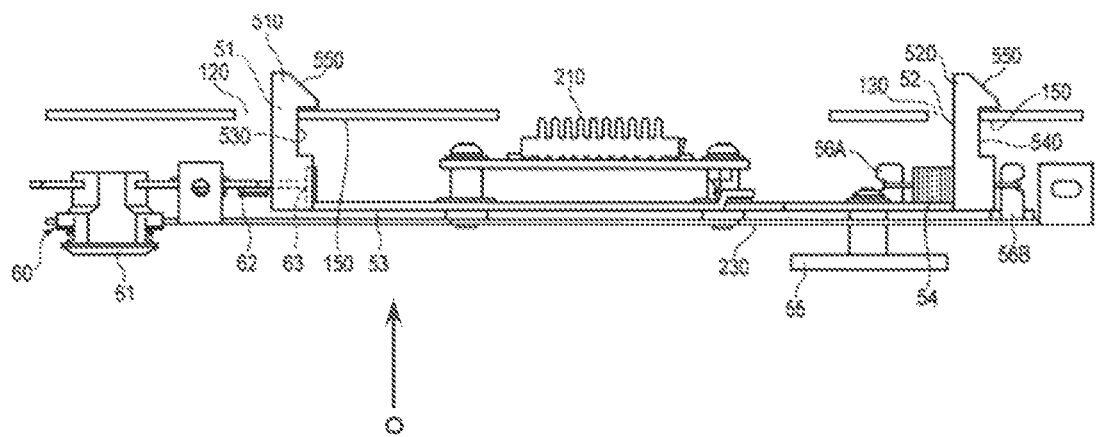
FIG. 5 is an explanation diagram for explaining functions of the connection mechanism and the lock mechanism of the docking station and the data processing terminal of the commodity sales data processing apparatus according to the embodiment.

FIG. 5 is an explanation diagram for explaining functions of a connection mechanism and a lock mechanism 60 of the docking station 20 and the data processing terminal 10 which are the essential portions of the commodity sales data processing apparatus 1 shown in FIG. 1.

Further, an operator operates the commodity sales data processing apparatus 1 facing toward a direction of an arrow O of FIG. 1. In the following description, a front side, and a back side in the direction of the arrow O are called forward, and backward, respectively. In addition, a horizontal direction seen from the direction of the arrow O is called a width direction.

The commodity sales data processing apparatus 1 has the data processing terminal 10 and the docking station 20. To begin with, a structure of the docking station 20 will be described.

The docking station 20 has a stationary box type main body 23 and the table 21 on which the data processing terminal 10 is to be placed. The main body 23 houses a printer, a storage device, a power source unit, and a communication interface and so on (none of them are shown) inside thereof. On the forward surface of the main body 23, a housing portion 24 of terminals for connecting a handy scanner and a card reader and so on (not shown), for example, a power source switch 25, and a slide button 26 to lock the table 21 and so on are arranged.

The power source unit feeds a driving power to input/output devices such as the printer and the storage device in the docking station 20. In addition, the power source unit feeds a driving power to the data processing terminal 10 via a male connector 210. In addition, the power source unit charges a battery (not shown) of the data processing terminal 10. Further, the method of feeding power to the data processing terminal 10 by the power source unit is not limited to the physical connection using connectors, but may be a method to feed power by a noncontact charging system, for example.

The printer prints on a roll sheet (not shown) to be conveyed, using a thermal head, for example. Since a printed roll sheet is issued as a receipt, it is cut off and discharged from a receipt issuing port 410. The printer uses a label sheet as the roll sheet, and thereby can also issue a label. In addition, the printer may be one using a printing system other than a thermal head.

The table 21 has a placing surface 27 on which the data processing terminal 10 is placed and which contacts with the rear surface of the data processing terminal 10, as shown in FIG. 1 to FIG. 3. In addition, the table 21 has the connection portion 22 for connecting the data processing terminal 10 placed on the placing surface 27 to the docking station 20. The slide button 26 provided at the main body side 23 is operated, and thereby the table 21 can be rotated in the vertical direction around the backward side separated from the connection portion 22 as a fulcrum. In other words, the table 21 also functions as an upper lid of the main body 23. For example, an operator operates the slide button 26, to rotate the table 21 in the upward direction in the drawing, and thereby can exchange a sheet for a printer housed inside the main body 23. The table 21 is fitted on the main body 23 in a posture that the placing surface 27 tilts downward toward the forward direction.

The connection portion 22 has a block-shaped chassis 28 which is integrally provided in front of the table 21. As shown in FIG. 4, the male connector (second connector) 210, two hooks 51, 52, and the lock mechanism 60 are provided inside the chassis 28. As shown in FIG. 3, a tip of the male connector 210 and tips of the hooks 51, 52 project from the backward of chassis 28. The chassis 28 includes a backward first wall portion 220 which extends approximately vertically to the placing surface 27, and a forward second wall portion 230 provided opposite to the first wall portion 220.

The above-described male connector 210 and the above-described hooks 51, 52 are provided on the first wall portion 220 to project therefrom. In addition, plate-like guide protrusions 240, 250 are provided to protrude from the outer surface of the first wall portion 220, while overlapping with the hooks 51, 52, respectively. A cylinder lock 61 of the lock mechanism 60, the receipt issuing port 410 of the printer, and a connection release slide button 55 are provided on the second wall portion 230.

The male connector 210 is arranged approximately at the center portion in the longitudinal direction of the connection portion 22, as shown in FIG. 4 and FIG. 5. The male connector 210 has twenty pin-shaped terminals, for example. As shown in FIG. 3, the twenty pin-shaped terminals are provided in the direction (that is a direction toward the backward) approximately vertical to the first wall portion 220, and project from the first wall portion 220. The male connector 210 electrically connects to a female connector 110 of the data processing terminal 10. The male connector 210 connects to the female connector 110, and functions as a terminal for feeding power to the data processing terminal 10, for example. Further, the male connector 210 functions as terminals for performing transmission/reception of information between the docking station 20 and the data processing terminal 10.

The two hooks 51, 52 are provided along the longitudinal direction of the connection portion 22, and at the both sides of the male connector 210 so as to sandwich the male connector 210 therebetween. The hooks 51, 52 are respectively engaged with engagement holes 120, 130 described later of the data processing terminal 10. As shown in FIG. 5, the hooks 51, 52 are integrally connected via a flat plate like connecting plate 53. Between the second wall portion 230 of the chassis 28 and the connecting plate 53, a tension coil spring 54 is stretched in a state to be slightly extended. That is, one end of the tension coil spring 54 is fitted to a fixed portion 56A of the connecting plate 53, and the other end is fitted to a fixed portion 56B of the second wall portion 230. The tension coil spring 54 energizes the hooks 51, 52 toward a direction (right direction in FIG. 5) to engage with engagement holes described later.

In addition, as shown in FIG. 5, the connection release slide button 55 is integrally fixed to the connecting plate 53. For this reason, an operator operates the connection release slide button 55 from the outside of the second wall portion 230, and thereby can move the hooks 51, 52 in the direction to disengage from the engagement holes 120, 130 described later respectively, against the energizing force of the tension coil spring 54. That is, the hooks 51, 52 can move in the direction to engage with the engagement holes 120, 130 described later, and in the direction to disengage from the engagement holes 120, 130, respectively.

As shown in FIG. 5, the lock mechanism 60 is provided at one end side (left side in the drawing) of the connection portion 22. The lock mechanism 60 has the cylinder lock 61, a plate 62 which is to be connected to this cylinder lock 61, and a pressing portion 63 which is provided at a tip portion of the opposite side of the cylinder lock 61 of this plate 62, and is to be pressed to an end portion of the connecting plate 53.

Next, a structure of the data processing terminal 10 will be described.

As shown in FIG. 2, the data processing terminal 10 includes a tablet portion 11 and a magnetic card reader 30. The tablet portion 11 has a rectangular and plate-like outer shape, so that the data processing terminal 10 is portable. The magnetic card reader 30 is provided along the right end edge in the drawing of the tablet portion 11. The tablet portion 11 has a touch panel 12 having an information input function on the surface. The tablet portion 11 includes a display device (not shown), the touch panel 12, a mask 13 and a rear surface cover 14. The touch panel 12 and the display device are arranged while being surrounded by a chassis 15 composed of the mask 13 and the rear surface cover 14.

The tablet portion 11 is a portable personal computer, for example, and has a battery (not shown) as its driving power source. Further, the tablet portion 11 has a CPU (Central Processing Unit), a ROM (Read Only Memory), a RAM (Random Access Memory), a USB (Universal Serial Bus) connector, a wireless unit and so on (none of them are shown).

Further, the tablet portion 11 has the female connector (first connector) 110 and the two engagement holes 120, 130, in the forward end surface of the chassis 15. The female connector 110 connects to the male connector 210 of the docking station 20. In addition, the engagement holes 120, 130 and the hooks 51, 52 cooperate respectively to function as a connection mechanism. That is, the connection mechanism includes the hooks 51, 52 and the engagement holes 120, 130. The connection mechanism connects the data processing terminal 10 and the docking station 20 in a separable state, by the respective engagements of the hooks 51, 52 with the engagement holes 120, 130.

As shown in FIG. 2, the female connector 110 is provided approximately at a center portion in the longitudinal direction of the rear surface cover 14, and at a position corresponding to the above-described male connector 210. The female connector 110 is a connector for electrically connecting the data processing terminal 10 to the docking station 20. The female connector 110 has a plurality of connection terminals for electrically connecting to the respective pin-shaped terminals of the male connector 210 provided in the docking station 20.

The two engagement holes 120, 130 are provided at positions corresponding to the above-described hooks 51, 52 in the rear surface cover 14, respectively. Specifically, the engagement holes 120, 130 are provided along the longitudinal direction of the rear surface cover 14, and at the both sides of the female connector 110 so as to sandwich the female connector 110 therebetween. The engagement holes 120, 130 receive the hooks 51, 52 and the guide protrusions 240, 250, respectively. The hooks 51, 52 received in the engagement holes 120, 130 are engaged with the engagement holes 120, 130, respectively. For example, the hooks 51, 52 are hooked in the engagement holes 120, 130, and thereby they are engaged with the engagement holes 120, 130, respectively. Further, the guide protrusions 240, 250 received by the engagement holes 120, 130 are fitted into the engagement holes 120, 130, respectively, as described below. The engagement holes 120, 130 have widths slightly larger than the guide protrusions 240, 250, so as to receive entering of the guide protrusions 240, 250, respectively. As will be described later, the guide protrusions 240, 250 perform positioning of the data processing terminal 10 to the docking station 20 in the width direction. In other words, the engagement holes 120, 130 have slightly larger widths than the guide protrusions 240, 250, respectively, and thereby they guide the entering of the guide protrusions 240, 250 into the engagement holes 120, 130, and perform positioning of the data processing terminal 10 to the docking station 20 in the width direction.

The magnetic card reader 30 has an approximately rectangular and block-shaped outer shape. The magnetic card reader 30 has a reading groove 31 for reading a magnetic card along its longitudinal direction. The magnetic card reader 30 is provided at a position where it is operable in the state that the data processing terminal 10 is connected to the docking station 20, that is at an end portion in the width direction, or at a backward end portion of the tablet portion 11. In the present embodiment, the magnetic card reader 30 is provided at the right side end portion in the width direction of the tablet portion 11 seen from an operator.

Next, an operation in which the data processing terminal 10 is connected to the docking station 20 by the above-described connection mechanism will be described.

To begin with, an operator places the data processing terminal 10 in a state separated from the docking station 20 as shown in FIG. 2, on the placing surface 27 of the docking station 20. Then, the operator slides the data processing terminal 10 along the slope of the placing surface 27, and toward the connection portion 22 of the docking station 20. By this means, the female connector 110 provided in the tablet portion 11 of the data processing terminal 10 and the male connector 210 provided on the connection portion 22 of the docking station 20 are connected. At the same time, the guide protrusions 240, 250 and the hooks 51, 52 of the connection portion 22 respectively enter into the engagement holes 120, 130 arranged at the both sides of the female connector 110.

As shown in FIG. 4 and FIG. 5, the hooks 51, 52 have locking portions 510, 520 and step portions 530, 540, respectively. The locking portions 510, 520 are provided at the tip sides of the hooks 51, 52, respectively. Specifically, each of the locking portions 510, 520 has an arrowhead shaped barb tapering toward the tip portion of each of the hooks 51, 52 at one end thereof. The step portions 530, 540 are provided at the base end sides of the locking portions 510, 520 of the hooks 51, 52, respectively.

When connecting of the docking station 20 and the data processing terminal 10 is started, edge portions 150 of the engagement holes 120, 130 come in contact with slope portions 550 (refer to FIG. 5) of the locking portions 510, 520 of the hooks 51, 52, respectively. Further, when the data processing terminal 10 is pressed toward the connection portion 22 by an operator, the hooks 51, 52 move in the width direction toward the cylinder lock 61 side, against the energizing force of the tension coil spring 54. When the slope portions 550 of the locking portions 510, 520 cross over the edge portions 150 of the engagement holes 120, 130, and thereby the locking portions 510, 520 completely enters into the engagement holes 120, 130, the hooks 51, 52 slightly return by the energizing force of the tension coil spring 54, and the edge portions 150 of the engagement holes 120, 130 enter into the step portions 530, 540, respectively (refer to FIG. 5). By this means, the hooks 51, 52 are engaged with the inside of the edge portions 150 of the engagement holes 120, 130, respectively.

The guide protrusions 240, 250 respectively enter into the engagement holes 120, 130, to perform positioning of the data processing terminal 10 to the docking station 20. In addition, the guide protrusions 240, 250 guide the entering of the hooks 51, 52 into the engagement holes 120, 130, respectively. In addition, the guide protrusions 240, 250 perform positioning of the data processing terminal 10 to the docking station 20 in the width direction, and thereby they suppress stress from being applied to the connection portion of the male connector 210 and the female connector 110, and prevent the damage of the male connector 210 and the female connector 110.

Next, an operation in which the docking station 20 and the data processing terminal 10 which have been connected by the above-described connection mechanism are separated will be described. In addition, in the following description of a separation operation, it is assumed that the engagements of the hooks 51, 52 and the respective engagement holes 120, 130 of the connection mechanism are not locked by the lock mechanism 60.

The docking station 20 and the data processing terminal 10 are connected as shown in FIG. 1. In the state that the data processing terminal 10 and the docking station 20 are connected, the hooks 51, 52 of the docking station 20 are engaged with the engagement holes 120, 130 of the data processing terminal 10, respectively. For this reason, an operator cannot draw out the male connector 210 from the female connector 110, in this state.

In order to release the engagement state of the hooks 51, 52 and the respective engagement holes 120, 130, that is, to make them in the disengagement state, an operator slides the connection release slide button 55 provided on the second wall portion 230 of the connection portion 22 of the docking station 20, in the direction of the cylinder lock 61.

In accordance with the sliding of the connection release slide button 55, the hooks 51, 52 move against the energizing force of the tension coil spring 54. By this movement of the hooks 51, 52, the engagement state of the hooks 51, 52 with the respective engagement holes 120, 130 is released, and thereby they become in the disengagement state. And when the operator slides backward the data processing terminal 10 placed on the placing surface 27 in this state, the connection between the docking station 20 and the data processing terminal 10 is disconnected, and thereby the data processing terminal 10 is separated from the docking station 20.

Subsequently, an operation in which the connection of the docking station 20 and the data processing terminal 10 by the above-described connection mechanism is locked will be described.

An operator operates the cylinder lock 61 provided in the docking station 20, and thereby can lock the docking station 20 to which the data processing terminal 10 is connected. The docking station 20 is locked, and thereby the engagement state of the hooks 51, 52 (locking portions 510, 520) and the engagement holes 120, 130, that are the connection portions of the data processing terminal 10 and the docking station 20, is locked. That is, it becomes unable to release the above-described engagement state by the operation of the above-described connection release slide button 55 by the operator. Specifically, when the cylinder lock 61 is operated by the operator for performing the above-described locking, the pressing portion 63 provided at the tip portion of the plate 62 connected to the cylinder lock 61 comes in contact with the end portion of the connecting plate 53. By this means, the plate 62 regulates the movement of the connecting plate 53, and makes the hooks 51, 52 unable to move in the width direction. In other words, the docking station 20 inseparably fixes the data processing terminal 10, in this state.

Next, an operation in which locking of the connection of the docking station 20 and the data processing terminal 10 is released will be described.

In order that locking of the connection of the docking station 20 and the data processing terminal 10 is released, it is necessary that the cylinder lock 61 of the lock mechanism 60 is unlocked. Here, the cylinder lock 61 is unlocked by a specific key operation using a separate key by an operator. The operator unlocks the cylinder lock 61, and thereby can release the above-described contact state between the pressing portion 63 and the end portion of the connecting plate 53. That is, when the cylinder lock 61 is unlocked, the pressing portion 63 separates from the end portion of the connecting plate 53. By this means, the regulation of the movement of the connecting plate 53 by the plate 62 is released, and thereby the hooks 51, 52 become able to move in the width direction. Accordingly, it becomes able to release the engagement state of the locking portions 510, 520 of the hooks 51, 52 and the respective engagement holes 120, 130, by the operation of the above-described connection release slide button 55. Accordingly, the data processing terminal 10 and the docking station 20 become separable.

According to the commodity sales data processing apparatus 1 as described above, the data processing terminal 10 is not carelessly dropped from the docking station 20, in the state that the data processing terminal 10 is placed on the docking station 20, to cause to be damaged. In addition, in order to separate the data processing terminal 10 from the docking station 20, the unlocking operation of the cylinder lock 61 and the operation of the connection release slide button 55 are necessary. For this reason, even when an operator is not present near the commodity sales data processing apparatus 1, another person cannot easily bring out the data processing terminal 10. In addition, in the commodity sales data processing apparatus 1, an operator operates the slide button 26, in the state that the data processing terminal 10 is connected to the docking station 20, and thereby can rotate the table 21. For this reason, in the commodity sales data processing apparatus 1, the operator can exchange a printer sheet, in the state that the data processing terminal 10 is placed on the table 21. In addition, the connection between the data processing terminal 10 and the docking station 20 of the commodity sales data processing apparatus 1 is locked by the lock mechanism 60. For this reason, after the close of business of a store or the like where the commodity sales data processing apparatus 1 is installed, for example, a person who does not possess the key cannot bring out only the data processing terminal 10 separately from the docking station 20.

In addition, the above-described embodiment is not limited to the above-described configuration.

In the embodiment, the cylinder lock 61 has been used, as the lock mechanism 60 to lock the connection between the docking station 20 and the data processing terminal 10, but the kinds of the lock and key of the lock mechanism 60 are not limited to this. It is only necessary that the lock mechanism 60 of the embodiment is a mechanism which locks the connection by the above-described connection mechanism, makes the data processing terminal 10 inseparable from the docking station 20, and can release the locking of the connection by the connection mechanism with a specific key operation. For example, it is also possible to use another mechanical key, an electronic key, or a combination thereof, as the lock mechanism 60, in place of the cylinder lock 61.

In addition, the specific key operation is a system to insert a key into a lock to unlock the lock, if the key is a mechanical key, and a system to match a prescribed number, or the like, if the key is a dial key. Further, the specific key operation is an input operation of a personal identification number, a method of inputting a prescribed sign, or the like, if the key is an electronic key.

In addition, in the above-described embodiment, the lock mechanism 60 (cylinder lock 61) has been provided at the docking station 20 side, but it is possible to provide the lock mechanism 60 at the data processing terminal 10 side.

In addition, in the case that, when a store or the like is open, it is troublesome to lock every time an operator leaves the commodity sales data processing apparatus 1, it is also possible to configure the lock of the docking station 20 so that it can be unlocked using a noncontact electronic key, for example. By this means, it is also possible to use a configuration which unlocks the docking station 20, when a holder of a key (operator) is present within a definite range, and locks the docking station 20, on the contrary when an operator is absent.

In addition, the data processing terminal 10 has been configured to connect to the connection portion 22 arranged at the forward side of the docking station 20, but the position of the connection is not limited to this. For example, it is also possible to use a configuration such that the connection mechanism is provided at a portion of the placing surface 27 of the docking station 20, and the rear surface of the data processing terminal 10 and the docking station 20 are connected.

In addition, the commodity sales data processing apparatus 1 is installed along with a drawer (not shown) to store change, in many cases. Therefore, a key used for the drawer and a key used for the lock mechanism 60 of the docking station 20 can be made the same. By this means, the management of the key becomes easy.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A commodity sales data processing apparatus, comprising:
    a portable data processing terminal having a first connector and a touch panel;
    a docking station having a second connector which connects to the first connector and feeds power to the data processing terminal, when the data processing terminal is connected to the docking station;
    a connection mechanism which connects the data processing terminal and the docking station in a separable state; and
    a lock mechanism which locks connection by the connection mechanism, so as to make the connection by the connection mechanism from in the separable state to in an inseparable state, and releases locking of the connection by the connection mechanism when a specific key operation is performed.

2. The commodity sales data processing apparatus according to claim 1, wherein:
    the touch panel is provided on a surface of the data processing terminal;
    the docking station has a placing surface on which the data processing terminal is placed, while the placing surface contacts a rear surface of the data processing terminal that is an opposite side of the surface; and
    the connection mechanism connects the data processing terminal placed on the placing surface to the docking station in the separable state.

3. The commodity sales data processing apparatus according to claim 1, wherein the connection mechanism includes;
    an engagement hole provided in the data processing terminal; and
    a hook provided on the docking station which enters into the engagement hole to engage with the engagement hole.

4. The commodity sales data processing apparatus according to claim 3, wherein:
    the hook is provided on the docking station movably in a direction to engage with the engagement hole and in a direction to disengage from the engagement hole.

5. The commodity sales data processing apparatus according to claim 3, wherein:
    the hook includes a locking portion formed at a tip side of the hook, and a step portion formed at a base end side of the hook; and
    the locking portion enters into the engagement hole while making contact with an edge portion of the engagement hole, and the edge portion of the engagement hole enters into the step portion, and thereby the hook is engaged with the engagement hole.

6. The commodity sales data processing apparatus according to claim 3, wherein:
    the hooks are provided by two at positions sandwiching the second connector therebetween, and the engagement holes are provided by two at positions corresponding to the two hooks, respectively.

7. The commodity sales data processing apparatus according to claim 6, wherein:
    the two engagement holes are provided at positions sandwiching the first connector therebetween; and
    the hooks enter into the engagement holes, respectively, when the first connector and the second connector are connected.

8. The commodity sales data processing apparatus according to claim 3, wherein:
    the docking station has a guide protrusion which is fitted into the engagement hole, to perform positioning of the data processing terminal to the docking station, when the docking station connects to the data processing terminal.

9. The commodity sales data processing apparatus according to claim 8, wherein:
    the guide protrusion is fitted into the engagement hole, to guide entering of the hook into the engagement hole.

10. The commodity sales data processing apparatus according to claim 4, wherein:
    the lock mechanism locks movement of the hook in a state to be engaged with the engagement hole.

* * * * *